(12) United States Patent
Roberts et al.

(10) Patent No.: US 8,730,814 B2
(45) Date of Patent: May 20, 2014

(54) COMMUNICATION NETWORK CONNECTION FAILURE PROTECTION METHODS AND SYSTEMS

(75) Inventors: Peter Roberts, Stittsville (CA); Carl Rajsic, Nepean (CA)

(73) Assignee: Alcatel Lucent, Paris (FR)

(*) Notice: Subject to any disclaimer, the term of this patent is extended or adjusted under 35 U.S.C. 154(b) by 1512 days.

(21) Appl. No.: 11/137,147

(22) Filed: May 25, 2005

(65) Prior Publication Data

US 2006/0268680 A1    Nov. 30, 2006

(51) Int. Cl.
*H04L 12/26*    (2006.01)
*H04L 12/70*    (2013.01)
*H04Q 11/04*    (2006.01)

(52) U.S. Cl.
CPC ..... *H04L 12/2602* (2013.01); *H04L 2012/5625* (2013.01); *H04L 43/0811* (2013.01); *H04L 43/50* (2013.01); *H04Q 11/0478* (2013.01)
USPC .................................................. 370/236.2

(58) Field of Classification Search
CPC .................. H04L 2012/5625; H04L 12/2602
USPC ................ 370/218, 216, 236.1, 241.1, 236.2, 370/242–245, 248–253, 237; 709/223–226, 709/227, 228; 714/4
See application file for complete search history.

(56) References Cited

U.S. PATENT DOCUMENTS

| | | | |
|---|---|---|---|
| 5,914,966 A * | 6/1999 | Bochereau ..................... | 714/712 |
| 5,933,425 A * | 8/1999 | Iwata ............................. | 370/351 |
| 6,167,025 A * | 12/2000 | Hsing et al. .................... | 370/216 |
| 6,181,680 B1 * | 1/2001 | Nagata et al. ................... | 370/248 |
| 6,457,050 B1 * | 9/2002 | Cowan et al. ................... | 709/224 |
| 6,538,987 B1 * | 3/2003 | Cedrone et al. ................. | 370/216 |
| 6,538,997 B1 * | 3/2003 | Wang et al. ..................... | 370/241 |
| 6,577,602 B1 * | 6/2003 | Beck et al. ................... | 370/241.1 |
| 6,654,923 B1 * | 11/2003 | Grenier et al. .................. | 714/752 |
| 6,865,602 B1 * | 3/2005 | Nijemcevic et al. ........... | 709/223 |
| 7,043,541 B1 * | 5/2006 | Bechtolsheim et al. ....... | 709/223 |

(Continued)

FOREIGN PATENT DOCUMENTS

| | | | | |
|---|---|---|---|---|
| EP | 1176759 A2 * | 1/2002 | ............. | H04L 12/24 |
| EP | 1 246 396 A2 | 10/2002 | ............. | H04L 12/24 |
| EP | 1246396 A2 * | 10/2002 | ............. | H04L 12/24 |

OTHER PUBLICATIONS

Youngtak-Kim; MPLS OAM functions and their applications to performance monitoring, fault detection and localization; 2003; Int. Assoc. Comput. Inf. Sci, Mount Pleasant, MI, USA.; 1st ACIS International Conference on Software Engineering Research and Applications (SERA '03), p. 6 pp., 22 refs, pp. 898.*

(Continued)

*Primary Examiner* — Luat Phung
*Assistant Examiner* — Kai Chang
(74) *Attorney, Agent, or Firm* — Eckert Seamans Cherin & Mellott, LLC

(57) ABSTRACT

Communication network connection failure protection methods and systems are disclosed. Control information is communicated in a communication network, and causes network elements of the communication network to establish connection monitoring for respective segments of the network connection. Connection monitoring information which is communicated on the segments allows failures such as loss of continuity to be detected and reported. Responsive to an indication of a failure on a segment, the segment on which the failure occurred is identified, and the network connection can be rerouted around that segment.

21 Claims, 6 Drawing Sheets

(56) References Cited

U.S. PATENT DOCUMENTS

| | | | |
|---|---|---|---|
| 7,054,273 B1* | 5/2006 | Scholtens et al. | 370/248 |
| 7,164,652 B2* | 1/2007 | Puppa et al. | 370/225 |
| 7,197,008 B1* | 3/2007 | Shabtay et al. | 370/218 |
| 7,345,991 B1* | 3/2008 | Shabtay et al. | 370/221 |
| 7,486,622 B2* | 2/2009 | Regan et al. | 370/236 |
| 7,606,887 B1* | 10/2009 | Stewart et al. | 709/223 |
| 7,626,947 B2* | 12/2009 | Bender et al. | 370/255 |
| 8,054,751 B2* | 11/2011 | Elie-Dit-Cosaque et al. | 370/241.1 |
| 2004/0202112 A1* | 10/2004 | McAllister et al. | 370/252 |
| 2004/0215758 A1* | 10/2004 | Kompella et al. | 709/223 |
| 2004/0223463 A1* | 11/2004 | MacKiewich et al. | 370/256 |
| 2005/0041633 A1* | 2/2005 | Roeser et al. | 370/351 |
| 2005/0099952 A1* | 5/2005 | Mohan et al. | 370/241 |
| 2005/0226236 A1* | 10/2005 | Klink | 370/389 |
| 2005/0265231 A1* | 12/2005 | Gunther et al. | 370/225 |

OTHER PUBLICATIONS

Cavendish, D., et al., "Operation, Administration, and Maintenance in MPLS Networks," IEEE Communications Magazine, XP-002447607, pp. 91-99, Oct. 2004.

Kompella, K., et al., "Directing MPLS Data Plane Failures," IETF, XP-002447608, pp. 1-32, Oct. 2004.

Sharma, V., et al, "Framework for Multi-Protocol Label Switching (MPSL)-based Recovery," IETF Standard, Internet Engineering Task Force, XP-015009252, pp. 1-40, Feb. 2003.

The ATM Forum Technical Committee, "Private Network-Network Interface Specification Version 1.1 (PNNI 1.1)," Apr. 2002.

* cited by examiner

COMMUNICATION NETWORK CONNECTION FAILURE PROTECTION METHODS AND SYSTEMS

FIELD OF THE INVENTION

This invention relates generally to communications and, in particular, to protecting communication network connections against silent failures.

BACKGROUND

Many communication networks support some sort of connection continuity monitoring function. Operations Administration and Maintenance continuity checking (OAM-CC) is an example of one such function for Asynchronous Transfer Mode (ATM) network connections. A version of OAM-CC also exists for Multi-Protocol Label Switching (MPLS) connections.

According to OAM-CC, cells are sent from a network element at one or both ends of a communication network connection, and a connection failure or fault, generally referred to as loss of continuity or LOC, is detected when the cells are not received when expected at the other end of the connection. Cell transmission and reception are typically accomplished by configuring an OAM-CC source at a network element at one end of a connection and an OAM-CC sink at a network element at the other end of the connection. OAM-CC sources inject OAM-CC cells into a dataflow on a connection, and OAM-CC sinks extract these cells from the dataflow for analysis. Bidirectional continuity checking is provided by configuring an OAM-CC source and sink at each end of a connection.

When a failure which causes a loss of continuity (LOC) in a connection occurs, due to a switch fabric failure or line card component failure for instance, the connection should be re-established as soon as possible to keep user services over the connection as continuous as possible. The action of detecting and re-establishing a connection as soon as possible after LOC is referred to herein as connection reroute on LOC.

One problem with conventional reroute on LOC is that the specific location along the path of the connection where a failure occurs is unknown. All that is known is that a failure, somewhere along the path, has occurred. According to one currently known reroute on LOC technique, a failed connection is rerouted based on a best path computed using the Private Network-to-Network Interface (PNNI) protocol, illustratively PNNI Specification Version 1.1, af-pnni-0055.002, April 2002. The best path, however, typically does not change and the rerouted connection thus often attempts the same path, traversing the same network nodes and links which experienced the failure in the first place. Although some LOC failures can be recovered when re-establishing connections over the same nodes and links in the network, it is generally best to avoid the failed portion of the network entirely so as to avoid repeated occurrences of the same failure. Avoiding the failed network elements increases the likelihood that connection reroute on LOC is able to re-establish user services when LOC is discovered.

The only known mechanism intended to address this problem is to keep track of the original path on a source node, and then find a completely diverse path when a failure occurs, thereby avoiding all original network elements, and accordingly any potentially failed elements, during the reroute. However, even with this solution, the location of the failure remains unknown. In addition, it may not be possible to set up an alternate diverse path which avoids all network elements in an original path. Further, the alternate diverse path is inherently inefficient and non-optimal since avoiding many network elements is costly and may very likely not be the optimal path after failure.

Therefore, there remains a need for improved failure detection and protection techniques which can locate the source of a connection failure and only reroute the connection around the actual failure location.

SUMMARY OF THE INVENTION

Embodiments of the invention address problems associated with detecting and repairing failed connections in communication networks, such as ATM and MPLS connections. According to one possible implementation, a series of OAM-CC segments, which together cover an entire connection, are created. Each segment is used to monitor the continuity of a corresponding link or node traversed by the connection. Upon detection of an LOC condition in one of the segments, the node detecting the LOC sends a connection release message identifying the location of the failure to the source of the connection, thereby enabling the source to avoid the failure when repairing the connection.

According to an embodiment of the invention, there is provided a connection controller for controlling a network connection in a communication network. The connection controller is configured to communicate control information in the communication network, the control information causing network elements of the communication network to establish connection monitoring for respective segments of the network connection.

In some embodiments, the connection controller is configured to communicate control information by transmitting control information, receiving control information, or both transmitting and receiving control information.

The control information may be included in an Information Element (IE) in control signalling.

The connection controller may be further configured to establish connection monitoring for a segment of the network connection.

The segments of the network connection may, together, cover an entire network connection.

Where the network connection is a connection between endpoint network elements of the communication network, the connection controller may be further configured to receive an indication of a failure on a segment of the network connection, and to establish a new network connection between the endpoint network elements, the new network connection avoiding the segment of the network connection on which the failure was detected.

The connection controller may be provided in a communication network which also includes network elements configured establish the network connection through the communication network. At least a subset of the plurality of network elements are preferably capable of establishing connection monitoring for segments of the network connection responsive to the control information. The connection controller may in this case be provided in a network management system of the communication network, in one or more of the network elements, or in both the network management system and one or more of the network elements.

Apparatus for monitoring a network connection in a communication network is also provided, and includes a connection monitor module and means for configuring the monitor module to communicate connection monitoring information with another monitor module through a segment of a plurality of segments of the network connection.

The monitor module may be configurable to communicate the connection monitoring information by transmitting connection monitoring information to the other monitor module, receiving connection monitoring information from the other monitor module, or both transmitting connection monitoring information to the other monitor module and receiving connection monitoring information from the other monitor module.

In some embodiments, the monitor module is configurable to communicate connection monitoring information with a plurality of other monitor modules through respective segments of the plurality of segments of the network connection.

The connection monitoring information may be OAM-CC cells, for example.

The monitor module may also be configurable to detect a failure on the segment of the network connection based on the connection monitoring information.

According to one embodiment, the means for configuring comprises a connection controller. The connection controller may be further configured to transmit an indication of a detected failure, the indication comprising information identifying the segment of the network connection, to a source of the network connection, the source of the network connection rerouting the network connection around the detected failure responsive to the indication.

The indication may be a connection release message, and the information identifying the segment of the network connection may be one or more of: an identifier of a network element in the communication network and an identifier of a communication link between network elements of the communication network.

The means for configuring may receive control information and configure the monitor module responsive to the control information.

In a communication network at least a subset of network elements which are configured to establish network connections through the communication network may include an apparatus for monitoring a network connection. However, a monitored segment of the network connection between network elements of the subset may include communication links between the network elements of the subset and one or more other network elements.

The network elements may include a source network element and a destination network element of the network connection. In this case, the monitor module of each network element of the subset of network elements through which the network connection is established is configured to detect a failure on a respective segment of the network connection based on the connection monitoring information. Each network element of the subset of network elements through which the network connection is established may be further configured to transmit an indication of a detected failure, the indication comprising information identifying the segment of the network connection, to the source network element, and the source network element may be further configured to receive the indication and to reroute the network connection around the detected failure responsive to the indication.

A further aspect of the invention provides a connection controller configured to receive an indication of a failure on a segment of a plurality of segments of a network connection, to identify the segment on which the failure occurred, and to reroute the network connection around the segment responsive to the indication.

The invention also provides a communication network connection failure protection method which includes establishing connection monitoring for a plurality of segments of a network connection in a communication network, monitoring the plurality of segments for a loss of continuity condition, and signalling, responsive to detection of a loss of continuity condition on a segment of the plurality of segments, an indication of a failure on the segment of the network connection.

If the network connection is a bidirectional connection, the establishing may involve establishing unidirectional connection monitoring for each direction of each segment to enable bidirectional monitoring of the segments.

The network connection may include a network connection established through network elements of the communication network. Responsive to control information may be transmitted to the network elements, connection monitoring may be established for segments between at least a subset of the network elements.

Signalling may involve, for example, transmitting a connection release message comprising an indication of a location of the failure.

In some embodiments, the method further includes rerouting the network connection around the location of the failure responsive to the connection release message.

Other aspects and features of embodiments of the present invention will become apparent to those ordinarily skilled in the art upon review of the following description of specific illustrative embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
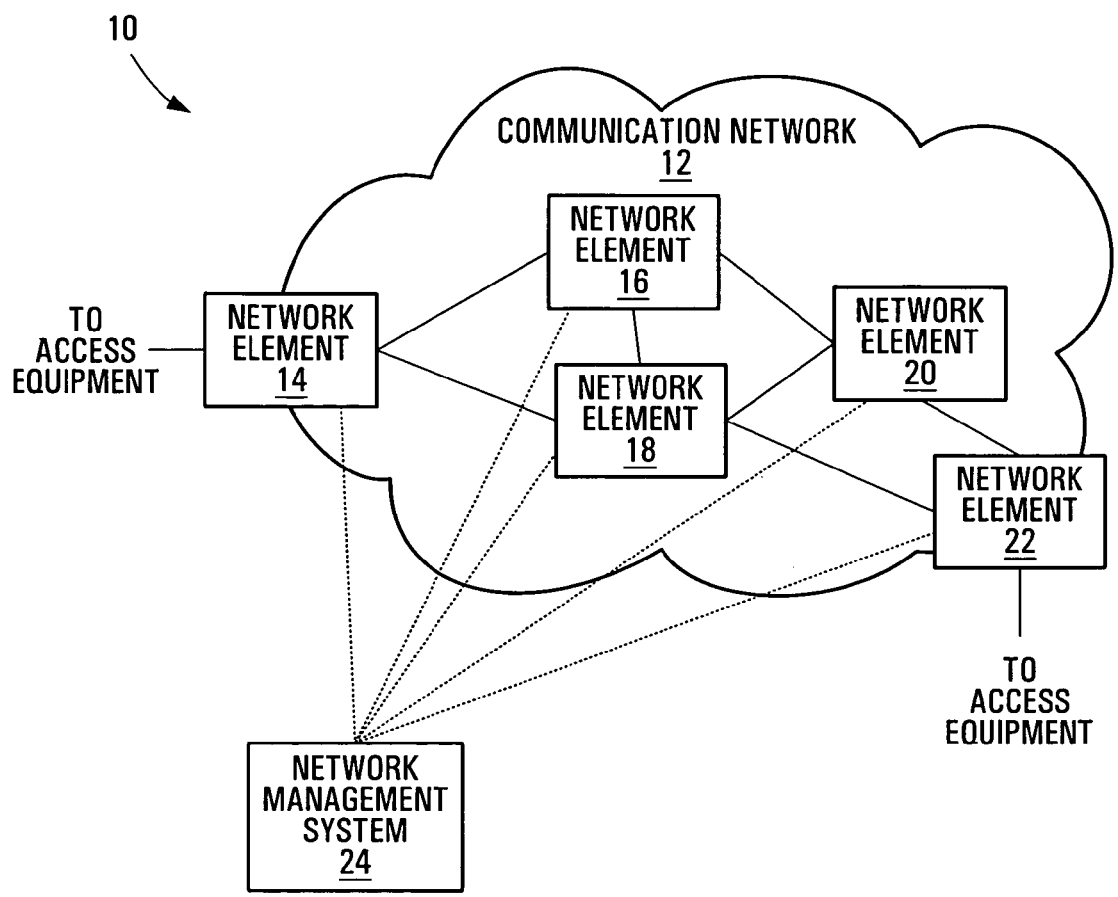
FIG. 1 is a block diagram of an example communication system in which embodiments of the invention may be implemented.

FIG. 1 is a block diagram of an example communication system 10 in which embodiments of the invention may be implemented. The communication system 10 includes a communication network 12 and a network management system (NMS) 24. The communication network 12 includes network elements 14, 16, 18, 20, 22 between which communication network connections through the network 12 may be established. The network elements in the communication network 12 include border or edge network elements 14, 22, which may be connected to access equipment, such as end user devices, other communication networks, and/or other external equipment, and interconnected core network elements 16, 18, 20.

Other equipment which may be provided within a communication network or operate in conjunction with a communication network, such as end user equipment and other user, management, or control equipment, has not been explicitly shown in FIG. 1 to avoid congestion. It should therefore be appreciated that the system of FIG. 1, as well as the contents of the other drawings, are intended solely for illustrative purposes. Embodiments of the present invention are in no way limited to any particular type of network, equipment and interconnections, or communications.

The network elements 14, 16, 18, 20, 22 may be switches, routers, or basically any communication equipment through which communication network connections may be established. A communication network connection may be virtually any type of connection over which communication signals are exchanged. As those skilled in the art will appreciate, connections may include wired connections, wireless connections, or some combination thereof. Connections may be established, for example, for telephone calls and data communication sessions. The particular types of communication connections available in a communication network may be dependent upon the type of the network elements 14, 16, 18, 20, 22, the protocols used in the network, the services offered by service providers using the network, the type of end user equipment for which the connections are established, for instance, and possibly other factors.

In operation, the network elements 14, 16, 18, 20, 22 may generate, receive, and process configuration control messages or commands to establish or set up, possibly to maintain, and to release or tear down communication network connections. Several different mechanisms may be used for communication network connection management. For example, ATM Switched Permanent Virtual Connections (SPVCs) may be established under the control of the NMS 24. SPVCs are established across the network 12 using ATM signalling and routing (typically PNNI) from a source node to a destination node. In this case, for example, the NMS 24 may configure the source on the network element 14 and optionally the destination on the network element 22, and PNNI will be used to establish the connection between them.

This type of connection, with which those skilled in the art will be familiar, represents an illustrative example of a type of connection in conjunction with which embodiments of the invention may be implemented. It should be appreciated that the present invention is in no way limited to SPVCs. Other types of connection, which may or may not involve the NMS 24, are also contemplated. ATM network connections also include Permanent Virtual Connections (PVCs) and/or Switched Virtual Connections (SVCs), for example. In other embodiments, non-ATM networks and connections, such as MPLS Label Switched Paths (LSPs), are monitored.

In the system 10, a network connection between the network elements 14, 22 may be established through the communication network 12 via different routes. These routes include the network elements 16, 20, the network element 18, the network elements 18, 20, or all three core network elements 16, 18, 20. One route for this example network connection is selected based on routing criteria, and the network connection is then established through the network elements in the selected route. Those skilled in the art will be familiar with many possible route selection and connection establishment techniques (e.g. PNNI).

A measure of protection against failures in the communication network 12 may be provided by monitoring network connections for continuity. End-to-end continuity of ATM and MPLS connections is typically monitored using OAM-CC cells. For bi-directional connections such as ATM SVCs or SPVCs, this is enabled by establishing an OAM-CC source and an OAM-CC sink for the cells at each end of the connection. In the case of unidirectional connections such as MPLS LSPs, an OAM-CC source is established at the source of the connection and an OAM-CC sink is established at the connection's destination.

The monitoring of a connection for continuity involves sending OAM-CC cells from an OAM-CC source to an OAM-CC sink via the connection. If an OAM-CC sink detects an interruption in the flow of OAM-CC cells it is receiving, then the OAM-CC sink notifies the signalling plane, which signals a release message to the source of the connection. Upon receiving the release message, the connection source releases the connection and attempts a reroute on LOC for the entire connection.

Figure 2:
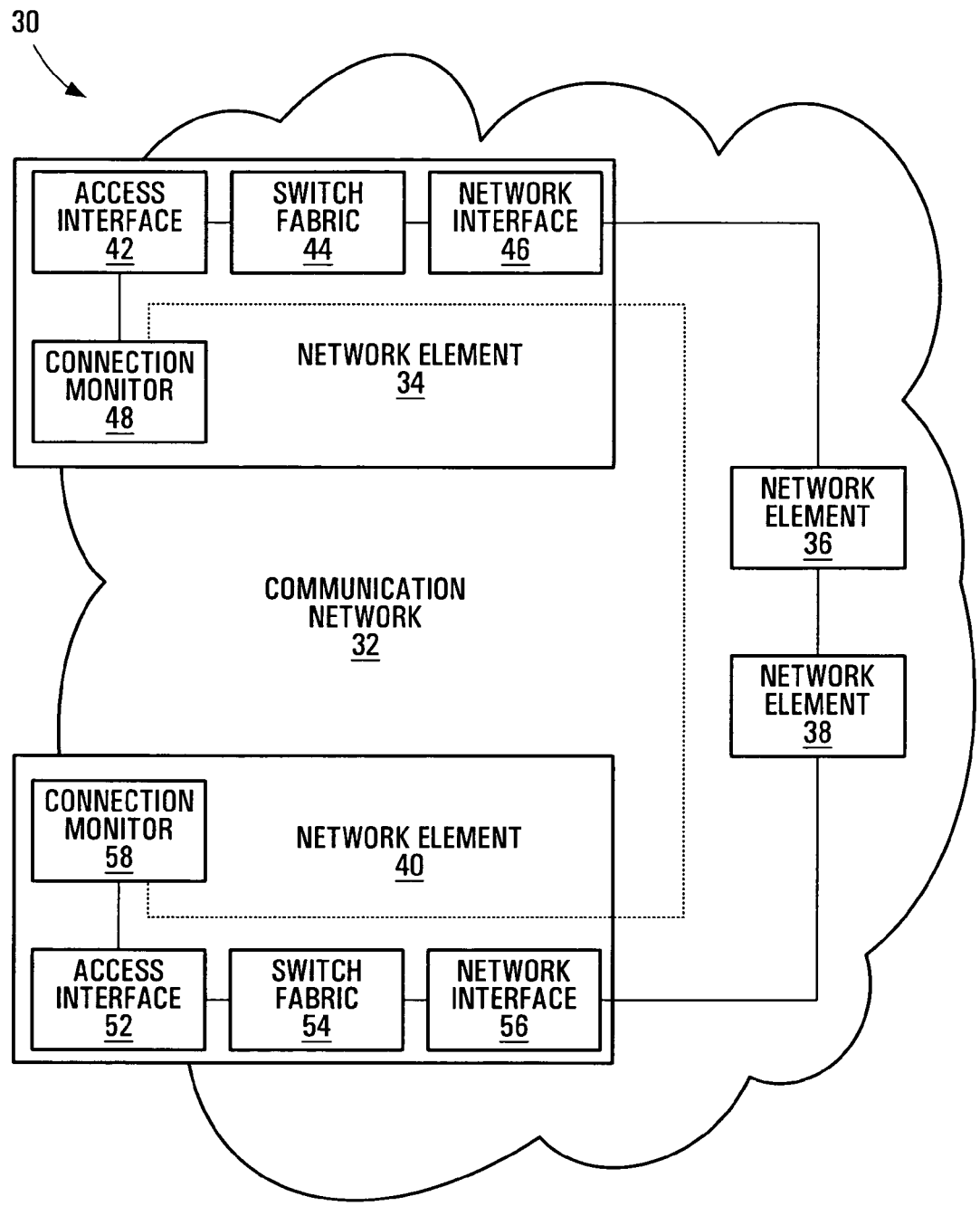
FIG. 2 is a block diagram of a communication network in which an entire connection is monitored.

FIG. 2 is a block diagram of a communication network in which an entire connection is monitored. In the system 30 of FIG. 2, endpoint network elements 34, 40 communicate via a network connection through the communication network 32. The network connection traverses the network elements 36, 38.

Each of the endpoint network elements 34, 40 includes an access interface 42, 52 for connection to access equipment (not shown), a switch fabric 44, 54, a network interface 46, 56, and a connection monitor 48, 58. Those skilled in the art will be familiar with the components of the endpoint network elements 34, 40 as shown in FIG. 2, as well as their operation.

The connection monitors 48, 58 cooperate to monitor the entire network connection between the endpoint network elements 34, 40. Although the network connection includes multiple segments, between the network elements 34, 36, between the network elements 36, 38, and between the network elements 38, 40, the connection monitors 48, 58 enable monitoring of only the entire network connection, from the access interface 42 to the access interface 52.

Consider the example of monitoring a unidirectional connection from the network element 34 to the network element 40 using OAM-CC. A failure of any communication link or component between the endpoint network elements 34, 40 would interrupt the flow of OAM-CC cells to an OAM-CC sink in the connection monitor 58 and be detected by the connection monitor 58 as a LOC condition. The connection monitor 58 is unable to determine the location of the failure, whether it is a failure of a particular communication link or a particular network element which could potentially be avoided in rerouting the connection.

When advised of a detected LOC condition, the source of a connection, which may be the network element 34 in the above example, attempts to reroute the connection over a completely diverse path, avoiding all of the communication links and network elements 36, 38 which were previously used.

According to an aspect of the present invention, segments of a network connection are monitored. In one embodiment, OAM-CC segments are established along the entire path of a connection to be monitored. Each OAM-CC segment may be used, for example, to monitor the continuity of the connection over a link between network elements or within a network element traversed by the connection, thereby monitoring each network element and link individually to ensure continuous operation of a network connection.

Establishing a series of OAM-CC segments along the route of a network connection allows the entire path to be monitored, while also monitoring each network element for failure. In the case of a bidirectional connection to be monitored using OAM-CC, segment-by-segment monitoring is performed in a bidirectional manner by establishing an OAM-CC source and an OAM-CC sink at each end of an OAM-CC segment. For unidirectional connections, either one OAM-CC source or one OAM-CC sink is established at each end of an OAM-CC segment, in accordance with the direction of traffic flow over the connection. Establishment and operation of segments for unidirectional and bidirectional connection monitoring according to embodiments of the invention is described in further detail below with reference to FIGS. 3 and 4, respectively.

Figure 3:
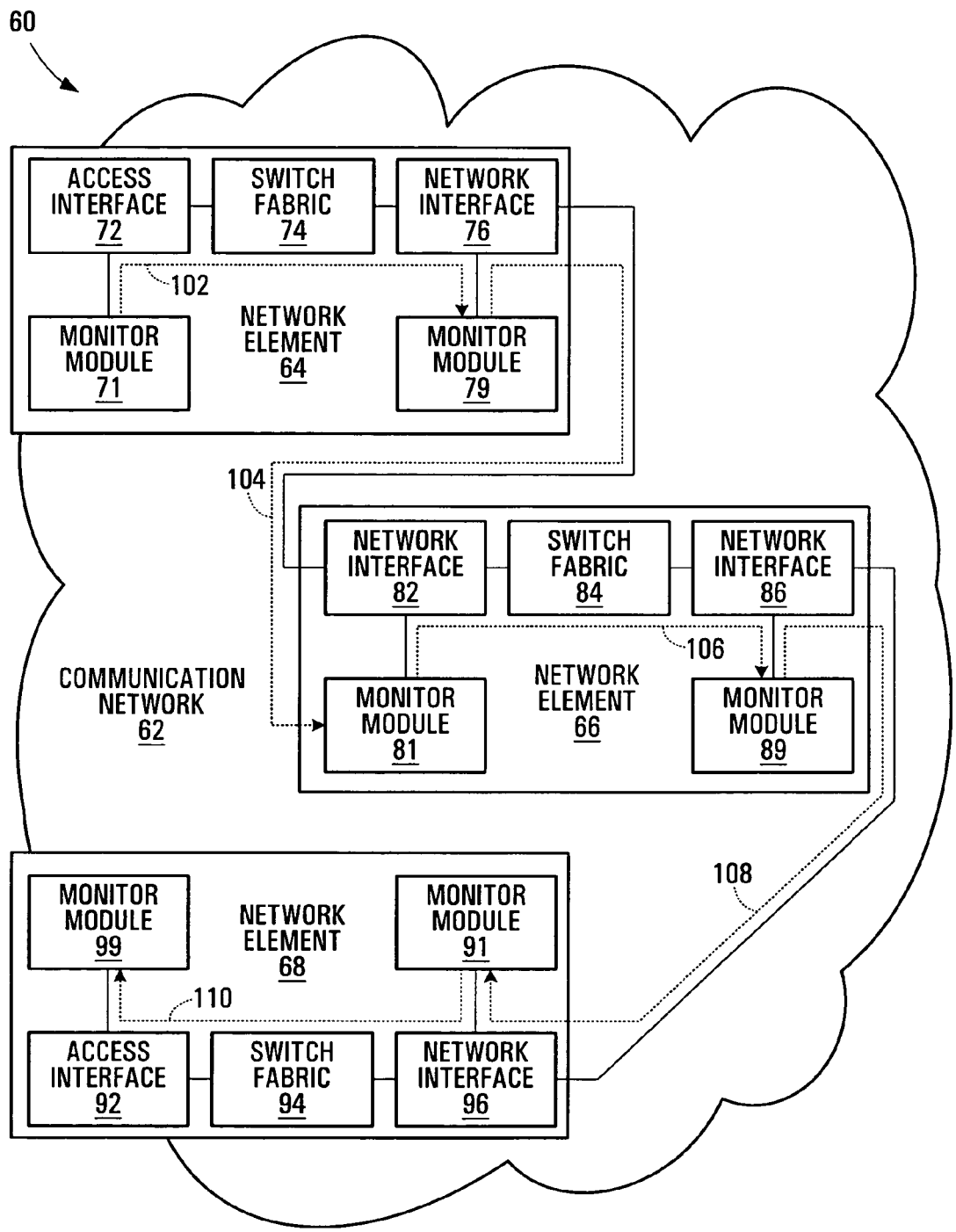
FIG. 3 is a block diagram of a communication network in which segments of a unidirectional connection are monitored.

FIG. 3 is a block diagram of a communication network in which segments of a unidirectional connection are monitored. The system 60 of FIG. 3 includes network elements 64, 66, 68 which are operatively coupled together in a communication network 62. A network connection between the network elements 64, 68 traverses the network element 66.

Each of the border network elements 64, 68 includes an access interface 72, 92 through which access equipment gains access to the communication network 62, switch fabric 74, 94 operatively coupled to the access interface 72, 92, and a network interface 76, 96 operatively coupled to the switch fabric 74 and to other equipment such as the network element 66 in the communication network 62. Monitor modules 71, 91 and 79, 99 are operatively coupled to the interfaces 72, 92 and 76, 96, respectively.

The core network element 66 similarly includes interfaces 82, 86 operatively coupled to other equipment, to a switch fabric 84, and to monitor modules 81, 89. However, the interfaces 82, 86 in a core network element would generally be the same type of interface, as shown, compatible with network interfaces provided in other equipment in the communication network.

It should be appreciated that the particular internal structures of the network elements 64, 66, 68 shown in FIG. 3 are intended solely for illustrative purposes. Network elements of a communication network may include further, fewer, or different components and/or have different interconnections than those explicitly shown. The present invention is in no way limited to communication networks or network elements of any specific type or architecture.

Those skilled in the art will be familiar with many possible implementations of the network element components shown in FIG. 3. Each access interface 72, 92, and network interface 76, 82, 86, 96, for example, could be any of various different types, depending upon the equipment with which it is to communicate and the communication protocols and media to be supported for instance. The access interfaces 72, 92 would be compatible with access equipment, protocols, and media, and the network interfaces 76, 82, 86, 96 would be compatible with other equipment, protocol(s), and a communication medium or media used in the communication network 62.

The interfaces 72, 76, 82, 86, 92, 96 and the switch fabrics 74, 84, 94 represent examples of components which might be implemented in communication network equipment and form part of a network connection. Traffic is switched between the network element interfaces, and/or possibly inserted into or extracted from a communication path, by the switch fabrics 74, 84, 94. Other components which may form a portion of a communication network connection will also be apparent to those skilled in the art.

According to an embodiment of the invention, the monitor modules 71, 79, 81, 89, 91, 99 are configured to establish connection monitoring for segments of the network connection between the network elements 64, 68. These modules may be implemented primarily in software, hardware, or some combination thereof. In one possible implementation, the monitor modules 71, 79, 81, 89, 91, 99 are stored in a memory (not shown) as software for execution by a processing component such as a microprocessor, a Digital Signal Processor (DSP), an Application Specific Integrated Circuit (ASIC), or a Field Programmable Gate Array (FPGA) for instance.

Monitored segments of a network connection may include either or both of internal equipment segments and external network segments. Internal segments enable monitoring of a portion of a connection within a network element and thus a data path through the network element. The segments 102, 106, 110, within the network elements 64, 66, 68, are internal segments. External segments such as the segments 104, 108 provide for monitoring of communication links between network elements.

It will be apparent that the monitored segments as shown in FIG. 3 enable monitoring of an entire network connection between the network elements 64, 68. However, it should be appreciated that monitored segments need not necessarily span a complete network connection in all embodiments. The techniques disclosed herein may be used to monitor only a portion of a network connection if desired.

One manner in which monitoring may be established for segments of a network connection is to set up OAM-CC monitoring by configuring OAM-CC sources and sinks at the network elements 64, 66, 68. As noted above, unidirectional monitoring is implemented in the system 60, and accordingly an OAM-CC source is configured to send OAM-CC cells from the monitor module 71 to the monitor module 79 to allow monitoring of the internal segment traversing the switch fabric 74 in the direction shown at 102. At the monitor module 79, an OAM-CC sink is configured to receive the OAM-CC cells and to determine whether the monitored internal segment has failed, based on the OAM-CC cells, or more specifically the absence of OAM-CC cells at an expected time.

The actual configuration of the OAM-CC sources and sinks may involve enabling or invoking OAM-CC source and sink software at the monitor modules 71, 79. This software may have been pre-installed in the network element 64 or downloaded to the network element 64 from an NMS of the communication network 62 or some other source.

Unidirectional monitoring for other segments of the network connection between the network elements 64, 68 may be established in a substantially similar manner. Configuring an OAM-CC source and an OAM-CC sink at the monitor modules 79, 81, respectively, establishes monitoring of the link between the network elements 64, 66 as shown at 104. Further OAM-CC sources at the monitor modules 81, 89, 91 and OAM-CC sinks at the monitor modules 89, 91, 99 similarly establishes monitoring for other segments in the directions shown at 106, 108, 110.

Monitored segments may be established after a network connection has already been established by configuring monitor modules to communicate, i.e., send and/or receive, connection monitoring information such as OAM-CC cells with other monitor modules.

According to another embodiment, segment-based monitoring is established when a connection is created. This may be accomplished through connection monitoring control information which is communicated in the network in connection setup messages or other control signalling. Connection monitoring control information might indicate that "Enhanced Connection Monitoring" is required on the connection for instance. This indication could be provided in an original setup message for the connection. In the case of an ATM connection, for example, the indication might be provided by a new or modified Information Element (IE), which informs each network element traversed by the connection that OAM-CC sources and OAM-CC sinks should be created.

The connection monitoring control information may originate with an NMS or a network element, depending upon the type of the connection. For NMS-controlled connections, the NMS preferably sends the connection monitoring control information to at least a first network element in a route. The NMS may also send the connection monitoring control information to all other network elements in the route. Alternatively, the first network element, and similarly each other network element in the route, passes the connection monitoring control information to a next network element in the route. The network elements traversed by the connection to be monitored establish monitoring for respective segments of the connection responsive to the connection monitoring control information.

Either of these transfer mechanisms may be used to distribute connection monitoring control information which originates with a network element instead of an NMS. For example, a network element which determines an entire route for a network connection may send connection monitoring control information to each network element in the route. It is expected, however, that a source network element which generates connection monitoring control information would more often be configured to send the control information to a next network element in the route, with each network element in the route passing the connection monitoring control information along the route.

A communication network may include network elements which do and do not support connection monitoring. In this case, a network connection may traverse both types of network element, with only those network elements which support connection monitoring establishing monitoring of segments of the connection. Suppose that the external segment between the network elements 64, 66 traverses an intermediate network element (not shown) which does not support connection monitoring. The intermediate network element cannot configure OAM-CC sources and sinks, and therefore cannot establish monitoring for segments of the connection between the network elements 64, 66. However, the network elements 64, 66 are still capable of establishing monitoring for the connection between them. In this case, a monitored segment which includes communication links between the network elements 64, 66 and another network element is established.

Monitored segments of a network connection may thus have varying "lengths". In the system 60 of FIG. 3, each external segment includes a communication link between consecutive network elements 64, 66 and 66, 68 in a network connection's route, whereas in the above example, the monitored segment between the network elements 64, 66 traverses an intermediate network element.

A communication network may also include network elements which support different types of monitoring. Whereas some network elements support internal and external segments, others might not support internal segments. If the network element 68 were to support only connection endpoint monitoring using a connection monitor operatively coupled to the access interface 92, for example, then a monitored segment between the network elements 66, 68 would include both an external communication link and an internal path within the network element 68.

Once monitoring has been established for segments of a network connection, failure of the connection may be detected. An OAM-CC sink, for example, may detect an interruption in the flow of OAM-CC cells that it is receiving. The OAM-CC sink provides an indication of the detected failure, by notifying a controller or other signalling control plane component (not shown). The controller sends an indication of the detected failure, in a connection release message for instance, to the source of the connection, such as an originating network element or an NMS. The failure indication may also or instead be sent to other equipment or components, illustratively to a destination network element.

The failure indication preferably also includes information identifying a network element or segment on which the failure was detected, in the form of a node or link identifier which indicates the location of the detected failure. This information allows the connection to be rerouted around the specific failure only.

An advantage of segment-based network connection monitoring as disclosed herein can be further illustrated with reference to FIG. 1. Consider a network connection from the network element 14, through the network element 18, to the network element 22. According to conventional techniques, the network elements 14, 22 monitor only the entire connection. Responsive to detection of a failure on the connection, the network element 14 or the NMS 24 would attempt to reroute the connection through the network elements 16, 20, totally avoiding the network element 18 and all portions of the previous route, even though the failure might have occurred on only one of the links. If the failure is on the link between the network elements 18, 22, for example, the next optimal route might be through the network elements 18, 20, although this route would not be selected since conventional monitoring techniques do not determine the location of a failure and thus avoid an entire previous route during rerouting. In this example, the new routing of the connection through the network elements 16, 20 is sub-optimal.

In accordance with an embodiment of the invention, however, monitoring could be established for each of the network elements 14, 18, 22 and the links therebetween. A failure detected on the link between the network elements 18, 22 is reported to a source of the network connection, which can then reroute the connection around only that link. In the above example, the sub-optimal route through the network elements 16, 20 need not be used during rerouting, since only the link between the network elements 18, 22 has failed and should be avoided. The next optimal route through the network elements 18, 20 is selected and communications between the network elements 14, 22 can resume.

Figure 4:
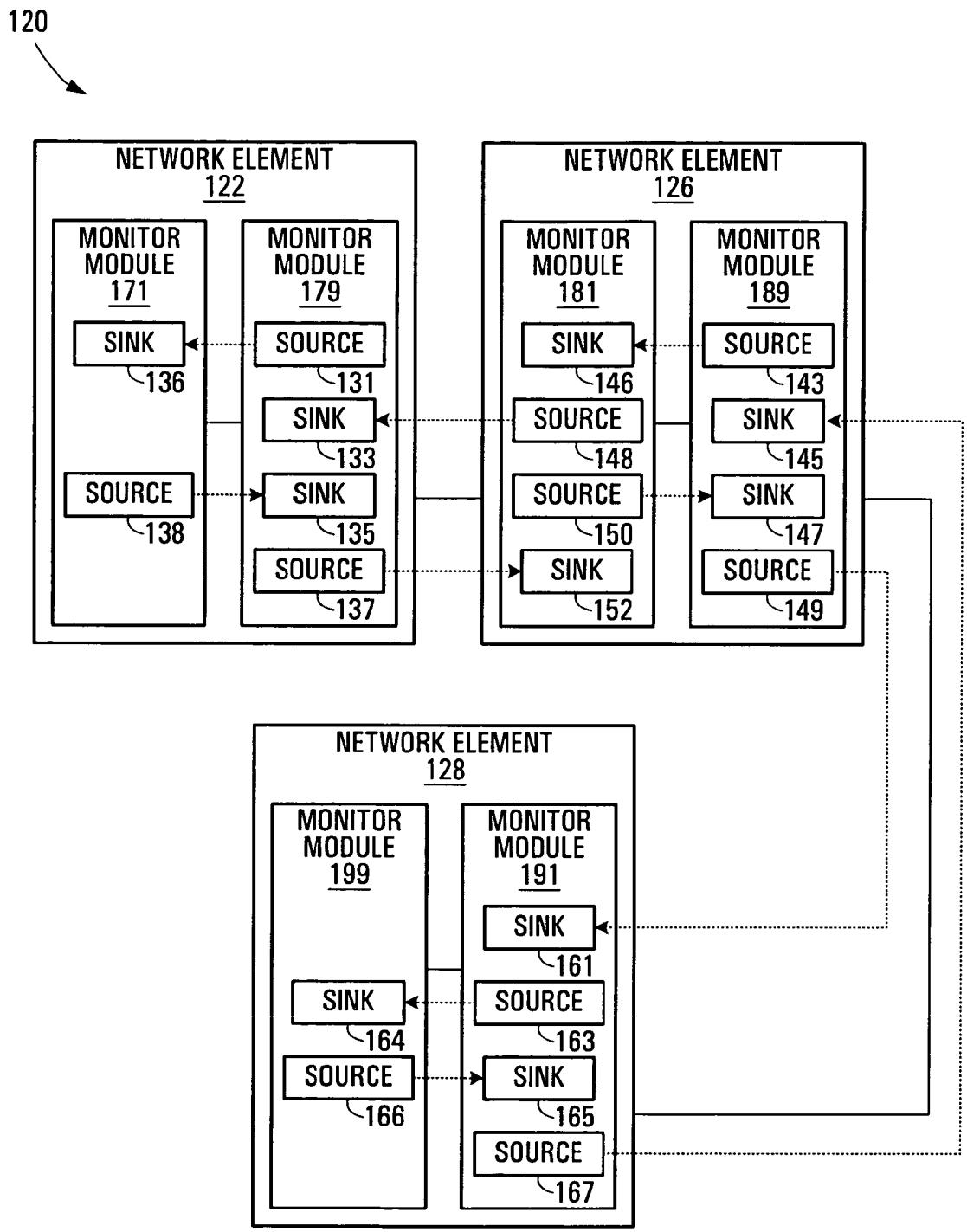
FIG. 4 is a block diagram of a communication network in which segments of a bidirectional connection are monitored.

Embodiments of the invention may also be used to establish monitoring for bidirectional connections. FIG. 4 is a block diagram of a communication network in which segments of a bidirectional connection are monitored.

The system 120 of FIG. 4 includes three network elements 122, 126, 128. Each network element includes monitor modules 171/179, 181/189, 191/199.

Sources and sinks are shown within the monitor modules as illustrative examples of functional components which may be configured to communicate connection monitoring information between monitor modules. The monitor modules 171/179, 181/189, 191/199 thus represent illustrative embodiments of the monitor modules 71/79, 81/89, 91/99 of FIG. 3.

In order to avoid congestion in FIG. 4, other components of the network elements and a communication network have not been explicitly shown. It should be appreciated, however, that the network elements 122, 126, 128 may incorporate further components, such as the interfaces and switch fabrics shown in FIG. 3. In this case, the internal segments between the monitor modules of each network element 122, 126, 128 traverse interfaces and a switch fabric, even though these segments are shown in FIG. 4 as direct connections.

OAM-CC sources and sinks represent examples of the sources and sinks shown in FIG. 4, and are used herein to illustrate the operation of the system 120.

For bidirectional monitoring, one source and one sink are configured at each monitor module 171, 179, 181, 189, 191, 199 for each monitored segment. Establishment of monitoring for a segment may be accomplished substantially as described above, by configuring sources and sinks at each monitor module. In one embodiment, the source and sink for a bidirectional connection are configured at the same time. The source 138 and the sink 136, for example, could be configured at the monitor module 171 responsive to a connection setup message which indicates that enhanced monitoring is to be enabled. Each other monitor module 179, 181, 189, 191, 199 then similarly establishes all required sources and sinks as the connection is established.

It may be possible to instead establish monitoring in each direction separately. In this case, the source 138 may be configured at the monitor module 171, and then the corresponding sink 135 is configured at the monitor module 179. Unidirectional monitoring setup may proceed for each segment of the connection in one direction, by configuring the source 137 and the sink 152 and so on, and then for the reverse direction. Bidirectional monitoring setup is complete when the sink 136 is configured at the monitoring module 171 for the reverse direction.

An intermediate approach may involve sequentially configuring bidirectional monitoring for each segment. The source 138 and the sink 135 would be configured as described above. Monitoring in the reverse direction for the internal segment in the network element 122 is then established by configuring the source 131 and the sink 136. This process is repeated for the external segment between the network elements 122, 126 by configuring the source 137, the sink 152, the source 148, and the sink 133. In another embodiment, a monitor module may configure multiple sources at substantially the same time in order to establish monitoring for segments more quickly. Both of the sources 137, 131 may be configured at the monitor module 179 after the sink 135 has been configured, for instance.

In operation, the source 138 in the monitor module 171 sends OAM-CC cells to the sink 135 for monitoring an internal segment of the network connection between the network elements 122, 128, in the direction shown. Monitoring of the internal segment in the reverse direction is provided by the source 131 and the sink 136. The monitor module 171 thus sends connection monitoring information, in the form of OAM-CC cells for instance, to another monitor module 179 for use by the monitor module 179 in monitoring the internal segment, and also monitors the internal segment for failure based on connection monitoring information received from the monitor module 179.

The monitor modules 179, 181 operate in conjunction with each other to monitor the external segment between the network elements 122, 126. The source 137 and the sink 152 enable monitoring of the external segment in one direction, with failure detection by the monitor module 181, and the source 148 and the sink 133 enable monitoring of the external segment in the other direction, with failure detection by the monitor module 179. The source/sink pairs 150/147, 143/146 of the monitor modules 171, 179, the source/sink pairs 149/161, 167/145 of the monitor modules 189, 191, and the source/sink pairs 163/164, 166/165 of the monitor modules 191, 199 similarly provide for bidirectional monitoring of respective internal and external segments. As above, a failure on a segment in a particular direction is detected by a monitor module incorporating a sink for OAM-CC cells flowing in that direction.

A failure in one direction on a segment of a bidirectional connection may be handled substantially as described above for a unidirectional connection, by rerouting the connection around a point failure. Even if a failure affects communications in only one direction on a bidirectional connection, it may generally be desirable to reroute the connection so as to re-establish communications in both directions.

It should be appreciated that the sources and sinks shown in FIG. 4 are not limited only to OAM-CC sources and sinks. Different types of sources and sinks which communicate different connection monitoring information than OAM-CC cells are also contemplated.

Where other types of connection monitoring information and monitoring schemes are used, bidirectional connection monitoring might be accomplished without configuring a separate source for every monitored segment. A single source might be configurable to send connection monitoring information on multiple segments, for example. A sink in a monitor module might similarly be configurable to receive connection monitoring information from multiple monitored segments. In this case, the sources 131, 137 and the sinks 133, 135 in the monitor module 134, for instance, could be respectively integrated into a single source and a single sink.

Figure 5:
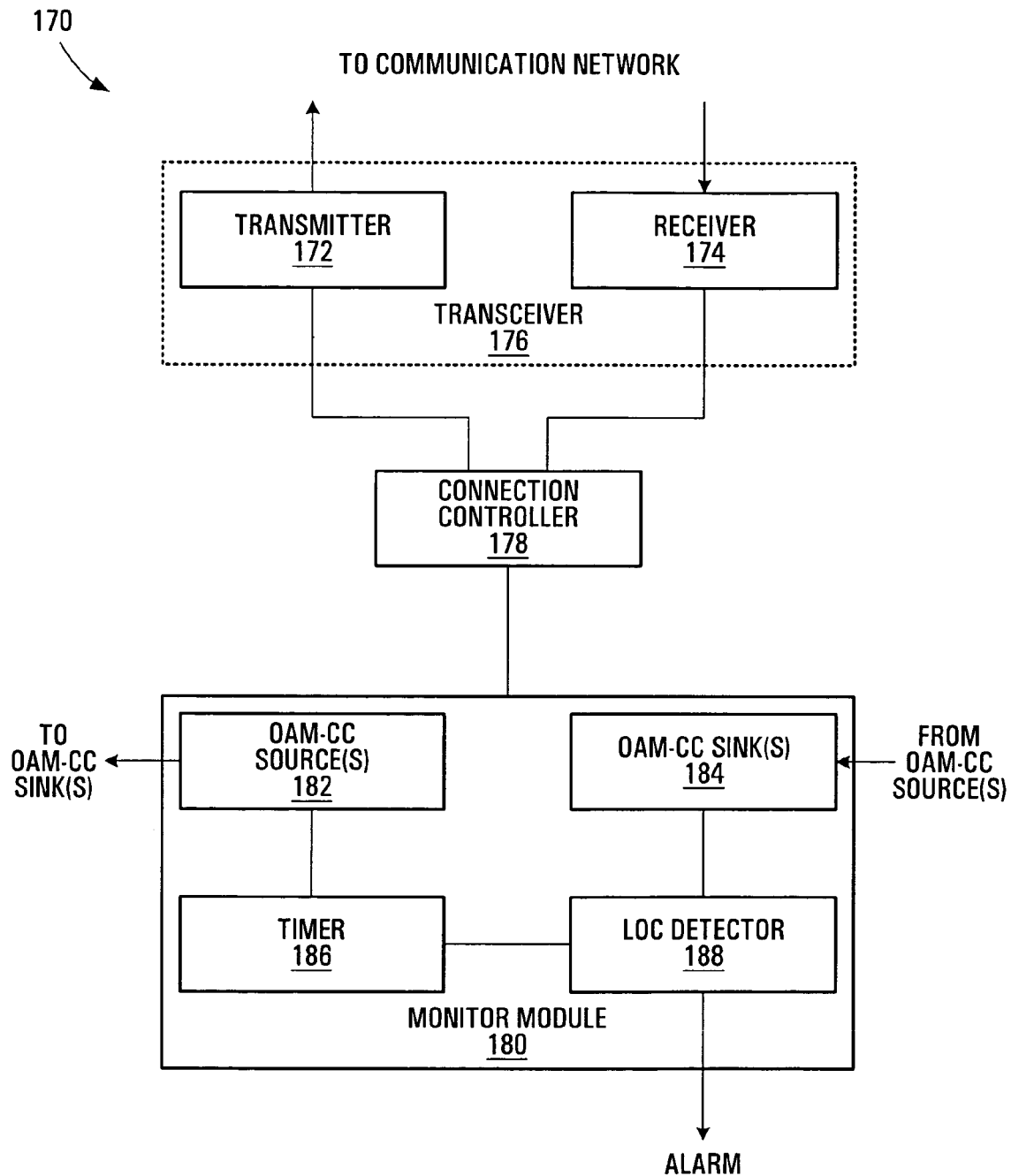
FIG. 5 is a block diagram of a network element according to an embodiment of the invention.

FIG. 5 is a block diagram of a network element, and presents a more detailed representation of functional components which may be used to implement segmented network connection monitoring according to an embodiment of the invention.

The network element 170 of FIG. 5 includes a transmitter 172 and a receiver 174 in a transceiver 176, a connection controller operatively coupled to the transmitter 172 and to the receiver 174, and a monitor module 180 operatively coupled to the connection controller 178. The monitor module 180 includes one or more OAM-CC sources 182, one or more OAM-CC sinks 184, a timer 186 operatively coupled to the OAM-CC source(s) 182, and a LOC detector 188 operatively coupled to the timer 186 and to the OAM-CC sink(s) 184.

The transmitter 172 and the receiver 174 in the transceiver 176 enable communications with equipment such as other network elements or access communication equipment, and may be implemented in hardware, software, or a combination thereof. In a network element having a structure as shown in FIG. 3, the transceiver 176 would represent components through which internal components of a network element interact with a switch fabric to insert traffic onto and extract traffic from data and/or control communication paths. For the purposes of the connection controller 178, control plane communications and thus a control path may be of particular interest, whereas the monitor module 180 is preferably operative to monitor a data path.

The connection controller 178, as well as the monitor module 180, may also be implemented primarily in hardware, in software for execution by a processing component, or using a combination of hardware and software.

Depending upon the mechanism used to set up monitoring for segments of a communication network connection which traverses the network element 170, the connection controller 178 may be configured in different ways to communicate connection monitoring control information in the network. For example, the connection controller 178 at a source network element, sends connection monitoring control information to other network elements of the communication network through the transmitter 172. The monitoring control information causes the other network elements which support connection monitoring to establish connection monitoring for respective segments of the network connection. If network elements relay connection monitoring control information to other network elements, during connection setup for instance, then the connection controller 178 in each network element would also be configured to send connection monitoring control information.

A connection controller may also or instead receive connection monitoring control information. A destination network element, for example, might receive the connection monitoring control information during connection setup, but need not necessarily also transmit this type of control information. The connection controller 178 in each network element might also be configured to receive but not necessarily transmit connection monitoring control information for connections which are established and/or controlled from an NMS or other remote system. Where connection control information is passed between network elements along the route of a connection, the connection controller 178 in at least the intermediate network elements between source and destination network elements are preferably configured to both receive and send connection monitoring control information.

As noted above, the connection monitoring control information might be provided within control signalling, illustratively as an "Enhanced Connection Monitoring" IE in a setup message, which is sent and received by connection controllers.

Although network elements in a communication network would normally incorporate some form of a connection controller to allow network connections to be established, some network elements in a communication network might not support connection monitoring. In a network element such as the network element 170 which supports connection monitoring, the connection controller 178 is further configured to establish connection monitoring for a segment of the network connection. In the network element 170, this is accomplished by configuring the monitor module 180 to communicate connection monitoring information with one or more other monitor modules.

Although the connection controller 178 and the monitor module 180 are shown separately in FIG. 5 for illustrative purposes, it should be appreciated that the function of configuration of source(s) and/or sink(s) in the monitor module 180 may actually be implemented as part of a connection controller 178 or incorporated into a monitor module. References herein to a connection controller configuring a monitor module should be interpreted accordingly. The monitoring configuration functionality of a connection controller may be provided by a monitor module itself or separately.

The monitor module 180 is configurable to transmit, receive, or both transmit and receive connection monitoring information. In the embodiment shown in FIG. 5, the connection monitoring information is in the form of OAM-CC cells. One or more OAM-CC sources 182 and one or more OAM-CC sinks 184 are configured to transmit and receive cells. Configuration of sources and sinks to establish unidirectional or bidirectional segment monitoring for one or multiple segments has been described in detail above. Each OAM-CC source 182 sends OAM-CC cells to a corresponding sink, which may be part of the same network element, for an internal segment, or a different network element. Each OAM-CC sink 184 receives OAM-CC cells from a local or remote OAM-CC source. Depending on the architecture of the network element and the type of monitored segments, some or all of the OAM-CC source(s) 182 and sink(s) may be operatively coupled to the transmitter 172 and the receiver 174 for communicating OAM-CC cells.

The timer 186 coordinates timing of OAM-CC cell transmission by the OAM-CC source(s) 182 and also provides a timing source for the LOC detector 188, which detects a LOC condition if an OAM-CC cell is not received on a monitored segment by an OAM-CC sink 184 within a predetermined time interval. Although shown as part of the monitor module 180, the timer 186 may be an external timing source, such as a clock source in a network element. It should also be appreciated that the LOC detection function may be integrated into each OAM-CC sink 184.

The monitor module 180 is thus configurable to detect a failure on a segment of a network connection based on connection monitoring information, OAM-CC cells in FIG. 5. An indication of a detected failure is preferably provided by the monitor module 180, as an alarm output from the LOC detector 188 in the network element 170. The failure indication may be processed locally by the network element 170, where the network element is the source network element of the connection for instance. The failure indication may also or instead be transmitted to the source of the connection, which may be another network element or a remote system such as an NMS for some connections.

In accordance with an embodiment of the invention, the failure indication includes information which identifies the segment on which the failure was detected. The location of a failure might be identified, for example, by a node or network element identifier or by a communication link identifier, or both. Where the failure indication is transmitted by signalling a connection release message, the failure location information may be included in an Information Element in a connection release message. Other failure detection and location reporting mechanisms may instead be used, examples of which may be apparent to those skilled in the art.

Reporting the location of a failure to the source of a network connection allows the connection to be rerouted around the detected failure responsive to the failure indication. This effectively establishes a new network connection over a route which avoids a segment of a previous route on which a failure was detected.

The specific equipment which performs connection repairing or rerouting functions may be a network element, the source network element of the connection for instance. In this case, the connection controller 178 is further configured to receive a failure indication and to reroute the network connection around the detected failure responsive to the indication.

Segmented monitoring of a rerouted connection may be established substantially as described above. In the event of a failure on a segment of the rerouted connection, a further route may be selected and used to repair the connection. In some embodiments, failure status of network elements or links on which failures were previously detected is monitored. This allows a previous route, which may be the optimal route for a connection as noted above, to be used in re-establishing a connection once a previously detected failure has been cleared.

For an NMS-controlled connection, rerouting functions are implemented in a connection controller at an NMS. Even though an NMS might not participate in actual monitoring of a connection, and thus would not include a monitor module, it may be responsive to detected failures to reroute connections. Accordingly, in some embodiments, a connection controller is configured to receive an indication of a failure detected on any of a plurality of segments of a network connection and a location of the segment on which the failure was detected, and to reroute the network connection around the location of the detected failure responsive to the indication.

Figure 6:
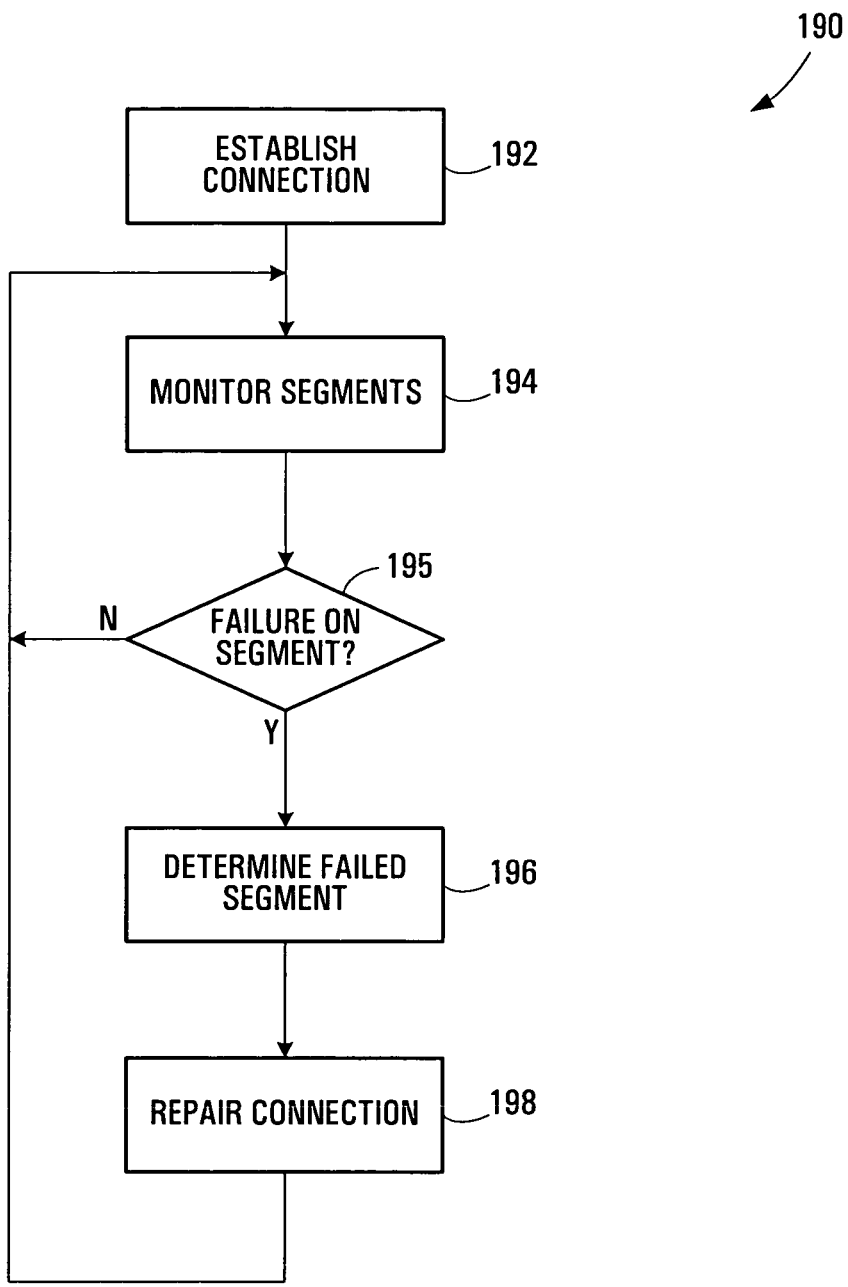
FIG. 6 is a flow diagram of a method according to an embodiment of the invention.

Although described above primarily in the context of systems or apparatus, aspects of the present invention may be embodied as methods. FIG. 6 is a flow diagram of an example of one such method.

The communication network connection failure protection method 190 of FIG. 6 begins with an operation 192 of establishing a connection. In the example method 190, the operation at 192 also involves establishing monitoring for segments of the connection as the connection is being established. As noted above, however, monitoring for a connection need not necessarily be established as the connection is being set up. In one embodiment, the monitored segments together enable monitoring of the entire connection established at 192.

The segments are monitored at 194 until a failure is detected on a segment at 195, or until the connection is released or otherwise terminated. The determination of the segment on which a failure is detected, as shown at 196, may be made on the basis of a node identifier, a link identifier, or other information included in a failure indication which is reported to a source of the connection, illustratively a source network element or an NMS. A segment on which a fault has occurred is thereby identified.

In the case of a monitored segment traversing network elements which do not support connection monitoring, determining the location of a detected failure at 196 may involve additional processing. A network element A, for example, might not be aware that a next network element B in the current route for a connection does not support connection monitoring, and that the segment which it is monitoring actually extends to a following network element C. The network element A might thus detect and report a failure on the A-B communication link which might have been caused by an internal failure of the network element B.

Although the network element A reports a failure on the A-B link, a source of the connection to which the failure is reported may be able to better assess the failure by consulting network equipment information. Such information may indicate the capabilities of the network elements A, B, and C, and be used to determine that the network element B does not support connection monitoring and thus the monitored and failed segment extends from A to C. Accordingly, the entire monitored and failed segment, including the network element B and the B-C link and not just the A-B communication link, may be avoided during rerouting.

At 198, the connection is repaired as described above by rerouting the connection around the location, i.e., the segment, of the detected failure.

Various possible ways of performing the operations of the method 190, as well as other embodiments of the invention which may include further, fewer, or different operations and/or a different ordering of the operations shown in FIG. 6, will be apparent from the foregoing description of systems and apparatus. Further variations not specifically disclosed herein may be apparent to those skilled in the art.

Embodiments of the invention may provide improved network availability through more successful connection rerouting on LOC by avoiding a failure which caused the LOC. Continuity failure detection and connection rerouting around continuity failures are quickly completed in order to provide a high level of network availability. Network availability is crucially important to communication network providers and customers.

Network resource utilization may also be improved through path selection of failed connections by avoiding only those network resources, network elements and links for example, which cause a failure.

Reporting the location of a failure, by identifying which network resources were involved in the failure, may offer a further advantage of improved network diagnostic capability.

What has been described is merely illustrative of the application of principles of the invention. Other arrangements and methods can be implemented by those skilled in the art without departing from the scope of the present invention.

For example, embodiments of the invention may be implemented with further, fewer, or different components and operations, interconnected in a different manner than explicitly shown in the drawings and disclosed herein. Embodiments of the invention may be implemented in conjunction with other than point-to-point connections as explicitly shown in the drawings for instance. Point-to-multipoint connections, including multicast and broadcast connections, are examples of other types of connection for which segmented monitoring may be established.

In addition, although described primarily in the context of systems and methods, other implementations of the invention are also contemplated, as instructions stored on a computer-readable medium, for example.

We claim:

1. A connection controller to communicate, in an Information Element in connection setup signaling for establishing a network connection between endpoint network elements in a communication network, connection monitoring control information for causing the endpoint network elements and one or more intermediate network elements traversed by the network connection to establish, responsive to the connection monitoring control information in the connection setup signaling and during connection setup while the network connection is being established, a series of Operations Administration and Maintenance Continuity Check (OAM-CC) segments for monitoring a plurality of segments of the network connection, the plurality of segments of the network connection together comprising the entire network connection, each OAM-CC segment comprising an OAM-CC source and an OAM-CC sink, at least one of the OAM-CC source and the OAM-CC sink of at least one OAM-CC segment being established at an intermediate network element, wherein the connection controller communicates connection monitoring control information by transmitting connection monitoring control information through a transmitter, receiving connection monitoring control information through a receiver, or both transmitting connection monitoring control information through a transmitter and receiving connection monitoring control information through a receiver.

2. The connection controller of claim 1, wherein the connection controller establishes an OAM-CC segment for monitoring one of the segments of the network connection.

3. The connection controller of claim 1, wherein the connection controller receives an indication of a failure on a segment of the network connection, and establishes a new network connection between the endpoint network elements, the new network connection avoiding the segment of the network connection on which the failure was detected.

4. A communication network comprising:
the connection controller of claim 1; and
a plurality of network elements, including the endpoint network elements and the one or more intermediate network elements, to establish the network connection through the communication network, at least the endpoint network elements and the one or more intermediate network elements being capable of establishing the OAM-CC segments for monitoring the plurality of segments of the network connection responsive to the connection monitoring control information.

5. The communication network of claim 4, wherein the connection controller comprises a network management system of the communication network, one or more of the plurality of network elements, or the network management system and one or more of the plurality of network elements.

17

6. An apparatus comprising:
a connection monitor module; and
a connection controller, operatively coupled to the connection monitor module, for configuring the connection monitor module to communicate connection monitoring information with another connection monitor module through an Operations Administration and Maintenance Continuity Check (OAM-CC) segment for monitoring a segment of a plurality of segments of a network connection between endpoint network elements in a communication network, the OAM-CC segment comprising one of a series of OAM-CC segments for monitoring segments of the network connection, the plurality of segments of the network connection together comprising the entire network connection, the network connection traversing one or more intermediate network elements between the endpoint network elements, the OAM-CC segment comprising an OAM-CC source and an OAM-CC sink, at least one of the OAM-CC source and the OAM-CC sink being established at an intermediate network element, the connection controller configuring the connection monitor module during connection setup while the network connection is being established, responsive to receiving connection monitoring control information in an Information Element in connection setup signaling for establishing the network connection, the connection monitoring control information for causing the endpoint network elements and the one or more intermediate network elements to establish the series of OAM-CC segments,
at least one of the connection monitor module and the connection controller being implemented using hardware.

7. The apparatus of claim 6, wherein the connection monitor module is configurable to communicate the connection monitoring information by transmitting connection monitoring information to the other connection monitor module, receiving connection monitoring information from the other connection monitor module, or both transmitting connection monitoring information to the other connection monitor module and receiving connection monitoring information from the other connection monitor module.

8. The apparatus of claim 6, wherein the connection monitor module is configurable to communicate connection monitoring information with a plurality of other connection monitor modules through respective OAM-CC segments of the series of OAM-CC segments.

9. The apparatus of claim 6, wherein the connection monitor module is configurable to detect a failure on the segment of the network connection based on the connection monitoring information.

10. The apparatus of claim 9, wherein the connection controller transmits an indication of the detected failure, the indication comprising information identifying the segment of the network connection, to a source of the network connection, the source of the network connection rerouting the network connection around the detected failure responsive to the indication.

11. The apparatus of claim 10, wherein the indication comprises a connection release message, and wherein the information identifying the segment of the network connection comprises one or more of: an identifier of a network element in the communication network and an identifier of a communication link between network elements of the communication network.

18

12. A communication network comprising:
a plurality of network elements, each of at least a subset of the plurality of network elements comprising:
a connection monitor module; and
a connection controller, operatively coupled to the connection monitor module, for configuring the connection monitor module to communicate connection monitoring information with another connection monitor module through an Operations Administration and Maintenance Continuity Check (OAM-CC) segment for monitoring a segment of a plurality of segments of a network connection between endpoint network elements, the OAM-CC segment comprising one of a series of OAM-CC segments for monitoring segments of the network connection, the plurality of segments of the network connection together comprising the entire network connection, the network connection traversing one or more intermediate network elements between the endpoint network elements, the OAM-CC segment comprising an OAM-CC source and an OAM-CC sink, at least one of the OAM-CC source and the OAM-CC sink being established at an intermediate network element, the connection controller configuring the connection monitor module during connection setup while the network connection is being established, responsive to receiving connection monitoring control information in an Information Element in connection setup signaling for establishing the network connection, the connection monitoring control information for causing the endpoint network elements and the one or more intermediate network elements to establish the series of OAM-CC segments,
at least one of the connection monitor module and the connection controller being implemented using hardware.

13. The communication network of claim 12, wherein the plurality of segments of the network connection include a monitored segment of the network connection that comprises a series of multiple communication links between network elements of the plurality of network elements.

14. The communication network of claim 12, wherein:
the endpoint network elements comprise a source network element and a destination network element of the network connection;
at each network element through which the network connection is established and which comprises a connection monitor module, the connection monitor module detects a failure on a respective segment of the network connection based on the connection monitoring information;
each network element through which the network connection is established and which comprises a connection monitor module transmits an indication of a detected failure, the indication comprising information identifying the segment of the network connection, to the source network element; and
the source network element receives the indication and reroutes the network connection around the detected failure responsive to the indication.

15. A method comprising:
communicating, in an Information Element in connection setup signaling for establishing a network connection between endpoint network elements in a communication network, connection monitoring control information for establishing, responsive to the connection monitoring control information in the connection setup signaling and during connection setup while the network connection is being established, a series of Operations Administration and Maintenance Continuity Check (OAM- CC) segments for monitoring a plurality of segments of a network connection between endpoint network elements in a communication network, the network connection traversing one or more intermediate network elements between the endpoint network elements, the plurality of segments of the network connection together comprising the entire network connection, each OAM-CC segment comprising an OAM-CC source and a OAM-CC sink, at least one of the OAM-CC source and the OAM-CC sink of at least one OAM-CC segment being established at an intermediate network element; and monitoring the network connection using the OAM-CC segments.

16. The method of claim 15, further comprising:
receiving an indication of a failure on a segment of the network connection; and
establishing a new network connection between the endpoint network elements, the new network connection avoiding the segment of the network connection on which the failure was detected.

17. The method of claim 16, wherein establishing comprises configuring a connection monitor module at each of the endpoint network elements and the one or more intermediate network elements to communicate connection monitoring information with another connection monitor module through respective OAM-CC segments.

18. The method of claim 17, wherein configuring comprises configuring each connection monitor module to communicate the connection monitoring information by transmitting connection monitoring information to the other connection monitor module, receiving connection monitoring information from the other connection monitor module, or both transmitting connection monitoring information to the other connection monitor module and receiving connection monitoring information from the other connection monitor module.

19. The method of claim 15, wherein monitoring comprises detecting a failure on a segment of the network connection, the method further comprising:
communicating an indication of the detected failure to a source of the network connection, the indication comprising information identifying the segment of the network connection; and
the source of the network connection rerouting the network connection around the detected failure responsive to the indication.

20. The method of claim 19, wherein the indication comprises a connection release message, and wherein the information identifying the segment of the network connection comprises one or more of: an identifier of a network element in the communication network and an identifier of a communication link between network elements of the communication network.

21. The method of claim 16, wherein the network connection comprises respective communication links between a plurality of network elements, including the endpoint network elements and the one or more intermediate network elements, and wherein the plurality of segments include a monitored segment of the network connection that comprises a series of multiple communication links between network elements of the plurality of network elements.

* * * * *